United States Patent Office 3,130,204
Patented Apr. 21, 1964

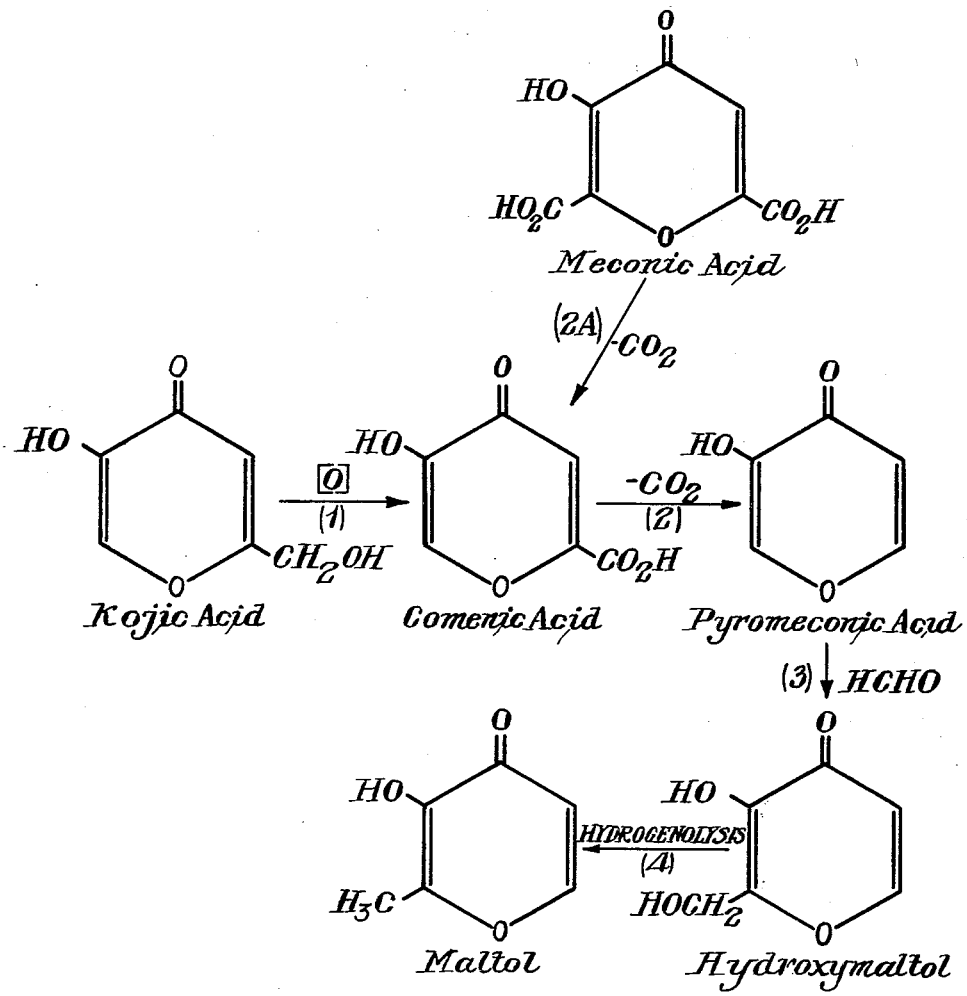

3,130,204
PREPARATION OF GAMMA-PYRONES
Bryce E. Tate, Niantic, Conn., and Robert L. Miller, Brooklyn, N.Y., assignors to Chas. Pfizer & Co., Inc., New York, N.Y., a corporation of Delaware
Filed Feb. 7, 1962, Ser. No. 171,732
15 Claims. (Cl. 260—345.9)

The present invention relates to the preparation of gamma-pyrone compounds and particularly relates to a process for the preparation of an especially valuable gamma-pyrone, maltol.

It is well known that maltol, 3-hydroxy-2-methyl-gamma-pyrone, is one of the most valuable gamma-pyrones. Its utility derives from the fact that maltol enhances the flavor and aroma of a variety of food products, thereby making them even more acceptable to the consumer. Among the foods which are markedly improved in these respects by maltol may be mentioned baked products such as breads, cakes and pies; confections such as candies and ice-creams and certain beverages such as coffee. In addition, maltol is used as an ingredient in perfumes and essences.

Heretofore, maltol has been obtained in limited quantity from natural products by difficult and expensive extraction processes. The commercial production of maltol has depended, for example, upon the destructive distillation of wood and, as is well known, these pyrolysis reactions generally provide low yields of the desired product. Furthermore, isolation processes have a tendency to be limited in capacity to the total supply of raw material readily available. In addition, there is a tendency for maltol obtained from such destructive-distillation processes to contain certain impurities which adversely affect its use as an aroma enhancer.

It has now been found possible to effect by the process of this invention the chemical synthesis of maltol from kojic acid, 2-hydroxy-methyl-5-hydroxy-gamma-pyrone, a substance which is readily available in large supply from economical fermentation processes. Furthermore, the maltol prepared by the process of this invention has been found to be free of contamination by impurities ordinarily found in maltol prepared by the aforementioned prior art destructive distillation processes.

It is accordingly a principal object of the present invention to provide a means to prepare maltol.

A more specific object is to prepare maltol from a freely available, economical starting material, kojic acid.

A further object of the invention is to provide maltol in a form particularly free of contaminants which adversely affect its utility as a flavor and aroma enhancer.

An additional object of the invention is to produce valuable gamma-pyrone intermediates such as pyromeconic acid and hydroxymaltol from kojic acid.

Other objects will be apparent to those skilled in the art from the following description.

The drawing is a flow sheet illustrating the reactions involved in the present invention.

The process of the present invention comprises (1) treating kojic acid with oxygen in the presence of a noble metal catalyst at a pH of at least about 10 to form comenic acid, (2) decarboxylating said comenic acid to form pyromeconic acid, (3) treating the pyromeconic acid with formaldehyde at a pH of at least about 5 to form hydroxymaltol and (4) reducing the hydroxymaltol under acidic to substantially neutral conditions to form maltol.

As will be exemplified hereinafter, this process of this invention results in a yield of maltol of about 50 percent based on kojic acid. In comparison with other routes using piperidinomethylpyromeconic acid or chloromaltol as intermediates and which yield maltol in respective yields of 1.6 percent and 5.5 percent, the process of the present invention is the first commercially feasible synthesis of maltol from kojic acid.

With respect to the first step (1) in the process of this invention, it is known from the prior art that when it is attempted to prepare comenic acid by treatment of kojic acid with oxygen in the presence of catalysts or with other oxidizing agents such as nitric acid or potassium permanganate, only traces of comenic acid are formed. Since kojic acid cannot usually be recovered from these reaction mixtures, the results are believed to be due to extensive destruction of the pyrone ring during said treatments. Furthermore, as is stated by Heyns in volume 87, Chemisches Berichte, page 14, 1954, the use of alkaline conditions during the catalytic oxidation of kojic acid with oxygen and in the presence of a catalyst would not be possible because of rapid destruction of the pyrone ring and, in fact, only traces of comenic acid could be obtained even at pH 7.4. It was therefore not to be expected that when kojic acid was treated with oxygen in the presence of a noble metal catalyst in solution at a pH of above 10, no destruction of the gamma pyrone ring occurred, but instead the 2-hydroxymethyl group was cleanly oxidized to the corresponding 2-carboxylate in nearly quantitative yields. Prior to the improved process of the present application, the only known synthesis of comenic acid from kojic acid in commercially feasible yield involved conversion of kojic acid to the corresponding 5-methyl ether derivative, oxidation of said ether to the corresponding methyl ether derivative of comenic acid and demethylation of said derivative to comenic acid. The overall yield of comenic acid from kojic acid by such an indirect process was of the order of only 25 percent.

It is a critical embodiment of step (1) of the present invention that the oxidation be carried out in an alkaline medium at pH 10 or above. It has been found that attempts to practice this step at lower pH's, for example, at pH 9 and at pH 7, have given results substantially in accord with prior art, that is, only trace amounts of comenic acid are obtained. On the other hand, the invention is broadly operable at pH's above 10, in fact, it is operable above the upper limit of measurable pH which is 14. For best yields and a particularly desirable rate of oxygen uptake it is preferred to practice step (1) of the instant invention at pH's of between about 11 and about 13.

The method of maintaining said minimum pH has not been found to be critical. Thus, it is feasible to adjust the pH to the minimum value at the onset of oxygenation and to add base during the reaction either incrementally or continuously or, alternatively, enough base may be added initially and all at once so that the final pH of the mixture does not fall below said minimum.

The means for maintaining the minimum pH contemplated herein is not critical to step (1) of the invention. Any strongly alkaline reagent capable of dissolving in the reaction mixture and which is inert with respect to oxygen, to the catalyst and to other intermediates may be used. For example, alkali metal hydroxides such as lithium hydroxide, sodium hydroxide, potassium hydroxide, and the like can be used as well as alkali metal carbonates such as sodium carbonate and potassium carbonate. Alkaline earth hydroxides such as calcium hydroxide, and the like may be used but are not preferred because of their low solubility in water and a tendency to form chelates with the intermediates. Strong organic nitrogen bases are not preferred because of a marked tendency to poison the catalyst. Particularly preferred because of its ready availability and low cost is sodium hydroxide; this may be added either in its solid form or as a solution in water.

The type or amount of noble metal catalyst employed in step (1) of the instant invention is not critical to its application. Thus, it is possible to employ, for example, platinum and palladium, and the like, either in finely divided states (the so-called "blacks") or in such readily obtainable forms as oxides, or to employ noble metals supported on such solids as, for example, carbon and charcoal. The amount of catalyst employed can vary over a broad range, for example, 0.01, 0.1, 0.8, 1.0, 1.25, and 5 percent by weight of catalyst (calculated as metal) based on kojic acid have been used. It has been particularly convenient to employ about 1.0 percent of palladium based on the kojic acid used and to use said catalyst in the form of a commercially-available 5 percent palladium on carbon catalyst.

The oxygen used in step (1) of the process may be in the form of pure oxygen gas or it may be admixed with other gases. It is equally feasible to use pure oxygen or to use air (which contains about 23 percent of oxygen by weight) or to use mixtures of the two or to use other gas mixture containing oxygen so long as such other gases are inert with respect to the reaction intermediates and, in particular, do not poison the catalyst. It is especially convenient to employ oxygen-rich gas mixtures available as by-products from chemical manufacturing operations.

The reaction time and temperature for step (1) may be varied over a substantial range during practice of the instant invention. However, it is desirable to conduct the reaction at a temperature range from about 5 degrees to about 60 degrees C. and it is particularly preferred to carry out the reaction at temperatures below about 40 degrees C. It has been found that there tends to be a slight adverse effect on the yield and color of the products if temperatures of about 40 degrees C. are exceeded. The time of the reactions is found to depend primarily on the temperature at which it is carried out. In addition, the amount of catalyst used and the rate of introduction of oxygen influence the time required for complete consumption of the kojic acid. In general, times of about 4 through about 72 hours will be sufficient; the longer times usually are required at lower temperatures, at lower catalyst concentrations and at lower oxygen flow rates. In the direct preparation of comenic acid according to this invention, if the reaction is carried out at from about 20 degrees to about 40 degrees C. in the presence of about 1.0 percent catalyst based on kojic acid at a minimum pH of about 11 and at a flow rate equivalent to about 1400 ml./minute of oxygen per mol of kojic acid, said kojic acid has been substantially completely consumed at the end of about ten hours.

While it has been disclosed that the process is carried out with water employed as the solvent, it is to be understood that other inert solvents commonly employed in oxidation reactions can be used as minor components in admixture with water. It is preferred, however, to carry out step (1) of the reaction with water as the sole solvent rather than in mixtures to avoid difficulties sometimes found in obtaining precise and reliable measurements of pH.

The purity of the kojic acid is not particularly critical to the practice of the present invention. However, it is found that crude kojic acid of purity below about 60 percent by weight often contains in admixture with it certain substances which are known to poison the catalyst. While the effects of these catalyst poisons can be partially overcome as by use of increased amounts of catalyst, it is found to be preferable to use kojic acid with a purity of about 60 percent and above.

Isolation of the comenic acid is conveniently accomplished by acidification of the reaction mixture. Thus, after filtration to remove the catalyst, sufficient strong acid is added to bring the pH to below at least 2.5. Suitable acids for this purpose are hydrochloric, sulfuric, nitric, and the like. However, it is preferred to adjust the pH to below about 1 to insure against possible coprecipitation of alkali-metal derivatives of the product such as may occur at higher pH's. The comenic acid can be removed by filtration or by centrifugation and can be dried in the air or by other standard means.

With respect to the second step (2) of the process of this invention, it is known that comenic acid may be decarboxylated to form pyromeconic acid. However, as is indicated by the conditions used by previous investigators, the feasible commercial production of pyromeconic acid from comenic acid would be expected to be difficult and expensive. Thus, Garkusha in volume 16, Journal of General Chemistry, U.S.S.R., page 2025 (1946), reported that only a 50 percent yield of pyromeconic acid was obtained when equal amounts of comenic acid and copper powder were heated. It has since been found that the yield of comenic acid is not improved, but is, in fact, lowered if the decarboxylations are carried out under the so-called "classical" conditions. Thus, heating comenic acid with copper, copper bronze and copper salts in the presence, or absence of, quinoline led to pyromeconic acid in 15 to 50 percent yield. It was, therefore, surprising to find that, if comenic acid is heated in the presence of certain selected solvents, it is smoothly decarboxylated to pyromeconic acid and to find further a copper catalyst is not required for this reaction. Thus it is surprisingly found that pyromeconic acid can be obtained from comenic acid in 80 percent yield by the improved process contemplated by the present invention which comprises heating comenic acid in a solvent selected from the group consisting of naphthalene and mono- and di-lower alkylnaphthalenes said alkyl groups containing up to 4 carbon atoms; tetrahydronaphthalene and mono- and di-lower alkyl tetrahydronaphthalenes said alkyl groups containing up to 4 carbon atoms; diphenyl ether and mono- and dialkyl and mono- and dialkoxy-substituted diphenyl ethers said alkyl and alkoxy groups containing up to 4 carbon atoms; polyglycol diethers and monoether monoesters of the formula $$RO(CH_2CH_2O)_nR'$$

wherein $n$ is an integer of from 2 to 6, R is selected from the group consisting of lower alkyl or phenyl; and R' is selected from the group consisting of lower alkyl, lower acyl and phenyl, said lower alkyl and lower acyl groups containing up to 4 carbon atoms; triphenyl phosphite and phosphate and their mononuclear lower alkylated derivatives said lower alkyl groups containing up to 4 carbon atoms; aliphatic cyclic amides of the formula

wherein R is alkyl containing from 4 to 8 carbon atoms; monocarboxylic saturated aliphatic open-chain acids containing from 8 to 16 carbon atoms; and di-lower alkyl esters of phthalic acid and its mononuclear lower alkyl-substituted derivatives said lower alkyl groups having up to 4 carbon atoms to a temperature of at least that at which carbon dioxide is evolved, maintaining said temperature until evolution of carbon dioxide substantially ceases and recovering the pyromeconic acid which forms.

While it has been found that a catalyst is not necessary to obtain the improved yields resulting from application of the process of the invention, the addition of a copper salt such as cupric acetate may be advisable in some cases when a shortened reaction time is desired.

The temperature at which the decarboxylation may be carried out varies over a wide range. However at temperatures below 170° C., the rate of decarboxylation is too slow to be feasible and at temperatures above about 400° C. there exists a tendency for the yield of pyromeconic acid to be lowered because of secondary reactions. It is especially preferred to carry out the decarboxylation reaction at a temperature of from about 215 to about 250° C.

It is critical to the improved process of the present invention that the proper solvent be employed; not all solvents which boil in the same general range can be employed. For example when glycerol, saturated hydrocarbons, of which decalin is an example, mineral oil, N,N-diethyltoluamide, o - nitrochlorobenzene, nitrobenzene, quinoline and carbazole are used in the process of the present invention, pyromeconic acid is isolated in low yield or not at all. If, on the other hand, diaryl ethers, triaryl phosphites and phosphates, di-lower alkyl phthalates, glycol ethers, of which tetraethylene glycol dimethyl ether is an example, N-alkylpyrrolidones, of which N-cyclohexylpyrrolidone is an example, aromatic hydrocarbons, of which α-methylnaphthalene is an example, organic acids, of which isodecanoic acid is an example, and di-lower alkyl phthalates, of which dimethyl phthalate is an example, are employed the marked improvement in yield of pyromeconic acid is observed.

It is desirable to select a solvent which is not substantially more volatile than pyromeconic acid at the reaction temperature. For example, a solvent can be selected which is relatively higher boiling than pyromeconic acid and which will remain in the vessel during distillation of pyromeconic acid therefrom. Alternatively, a somewhat more volatile solvent may be employed and that portion which co-distills with the pyromeconic acid may be separated and re-used. Volatility of the solvent is not critical to the invention, however, since other embodiments may be employed wherein the pyromeconic acid remains in the reaction vessel and is separated from the solvent as, for example, by selective extraction into an appropriate third solvent which has no solvent power for the said decarboxylation solvent. Thus the comenic acid may be heated in a vessel in the presence of a water-immiscible solvent until substantially completely converted to pyromeconic acid and then the pyromeconic acid may be separated from the solvent by extraction into water.

Other desirable, but not critical, considerations in the selection of the solvent for practice of the process of this invention are: that its initial cost be low, that it be thermally stable, that it be relatively unreactive toward comenic and pyromeconic acids, that it be a low-viscosity liquid at room temperature, that it have low solubility for pyromeconic acid at room temperature, that it be non-toxic and that it have little smell or taste.

In an especially preferred embodiment of the improved decarboxylation process of the present invention, a suspension of crystalline comenic acid in from about 1 to about 3 volumes of solvent is placed in a reaction vessel and the mass is heated to about 215° C. A vacuum of about 150 mm. of mercury is applied to the system and the pyromeconic acid distills as it is formed. Most of the carbon dioxide is evolved during about 3 hours at this temperature and heating is continued until the pyromeconic acid ceases to distill. At the end of about 6 hours there is obtained an 80 percent yield of pyromeconic acid; the small amount of solvent which co-distills is separated from the product and can be returned to the reaction vessel.

Alternatively, a slurry of about equal parts of comenic acid and solvent may be added to the reaction vessel containing an equal volume of solvent heated to about 250° C. This embodiment provides for a reduction in reaction time of up to 50 percent and has no significant effect on the overall yield and purity of the pyromeconic acid.

With respect to step (3), the conversion of pyromeconic acid to hydroxymaltol, a significant improvement in yield is obtained according to the process of the present invention. It is known to the art that pyromeconic acid can be converted to hydroxymaltol in 65 percent yield by treatment with formaldehyde. These moderate yields as reported by Shemyakin et al, in volume 85, Doklady Acad. Nauk., U.S.S.R., pages 1301–1304 (1952) were obtained by carrying out the reaction in alcoholic solution in the presence of excess formaldehyde and with sodium acetate catalyst at a pH of up to about 8. Furthermore, in view of the known instability of gamma-pyrones in alkaline media and of the tendency of gamma-pyrones such as kojic acid to dimerize to 6,6-bis-condensation products when treated with formaldehyde in the presence of strong base, it was surprisingly found that pyromeconic acid in aqueous solution at a pH of at least about 8 is converted in high yields to hydroxymaltol by treatment with an approximately molecular equivalent of formaldehyde. It was also not to be expected that no dimerization of hydroxymaltol occurs under these conditions. Thus it is found that at least 85 percent yields of hydroxymaltol are obtained by the improved process of the present invention which comprises adjusting the pH of a solution of pyromeconic acid to at least about 8 before adding an approximately molecular equivalent of formaldehyde thereto.

Furthermore, it is surprisingly found that, if the reaction is carried out in an alcohol containing from 1 to about 3 carbon atoms, it is possible to obtain hydroxymaltol in yields of up to 90% if the treatment with formaldehyde is carried out in the presence of a substantially stoichiometric proportion, based on the pyromeconic acid, of a strong base selected from the group consisting of alkali metal hydroxides, such as sodium hydroxide, potassium hydroxide and the like, and alkaline earth metal hydroxides, such as calcium hydroxide and the like.

In aqueous media, the means for bringing the pH to at least 8 is not critical to the improved process of the present invention. Thus, bases such as sodium hydroxide, potassium hydroxide, lithium hydroxide, and the like can be used.

The method for adjusting the pH of the aqueous solution of pyromeconic acid to at least about 8 is not critical to the present invention. Thus the base may be dissolved in water and added to a solution of pyromeconic acid or, alternatively, the pyromeconic acid may be added to a solution of the base and the base and pyromeconic acid may be added either in solid form or as a solution.

For optimum yields, it is preferred to limit the amount of formaldehyde added to one mole equivalent based on the pyromeconic acid. The use of an excess of formaldehyde may decrease the purity of the product if an aqueous medium is employed.

As will be exemplified hereinafter, above pH 8 there are effects on reaction rate, yield and purity which appear to be due to the pH at which the reaction is carried out. Thus, the reaction time required to obtain highest yield decreases as the pH is increased from 8 through 10, the total yield increases and the product purity increases. Since there is a tendency for yield and purity to decrease at pH's above 10, for example, 13, it is preferred to carry out this step of the process at pH 10. It is not critical to the present invention that the formaldehyde be added in any particular form. Thus, the usual aqueous formulations of 37 and 30 wt.-percent, and the like, the commercial alcoholic formaldehyde solutions, the condensed forms of formaldehyde such as trioxymethylene and paraform and gaseous monomeric formaldehyde may be employed. It is particularly preferred from the standpoint of ease in handling to use aqueous formalin.

The following represents a preferred embodiment of the improved process of the present invention: pyromeconic is added to about four times its weight of water and to the stirred mixture is added sufficient 50 percent by weight aqueous sodium hydroxide solution to bring the pH of the resulting mixture to 10. This weight of caustic solution is equivalent to about ½ the weight of the pyromeconic acid originally taken. To this solution is added one mole equivalent of formaldehyde as a 37 percent by weight aqueous solution. The reaction temperature rises spontaneously from about 25° to about 35–40° C. in a short time and the clear reaction mixture is held for about three hours at a temperature of about 35° C. by running cooling water through the vessel jacket. The hydroxymaltol is isolated by adjusting the pH of the reaction mixture to 5 by adding 12 N hydrochloric acid solution. The slurry is cooled to about 5° C., is stirred for about 30 minutes and the product is removed by filtration. The filtrate can be further concentrated to about ⅕ volume and an additional amount of hydroxymaltol can be isolated. The combined yield of hydroxymaltol obtained according to the procedure outlined is of the order of 87 percent. Alternatively, as will be disclosed more fully hereinafter, the hydroxymaltol may be converted into maltol without isolation from solution. Since this procedure eliminates a filtration step, it is a preferred embodiment in the process of preparing maltol from kojic acid.

With respect to the final step (4) in the process of the present invention, it has been surprisingly found that hydroxymaltol may be converted directly to maltol in high yield. Previously, maltol has been prepared from hydroxymaltol only by first converting hydroxymaltol to chloromaltol and converting the chloromethyl group thereof to a methyl group. It is also known that kojic acid, an isomer of hydroxymaltol which has the hydroxymethyl group in the 6 instead of in the 2-position, cannot be reduced to allomaltol in good yield. In fact, yields of allomaltol of above 9 percent have not been obtained by the direct reduction of kojic acid under the same conditions which have led to yields of 90 percent of maltol from hydroxymaltol.

The present invention therefore contemplates a one-step process for the preparation of maltol which comprises treating with a reducing agent a solution of hydroxymaltol wherein the 3-hydroxyl group of said hydroxymaltol is substantially completely in the un-ionized form.

It is critical to the process of the instant invention that the hydroxymaltol species being treated is substantially in its un-ionized form.

It is known that hydroxymaltol exists in several distinct forms depending upon the relative acidity of the medium in which it is dissolved. Three of these species may be represented by the following formulas:

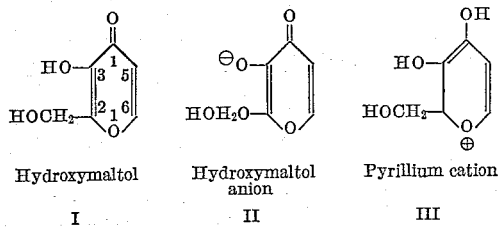

| Hydroxymaltol | Hydroxymaltol anion | Pyrillium cation |
| I | II | III |

If the hydroxymaltol species in solution is predominately of the hydroxymaltol anion form (II), the yield of maltol is very low after treatment of the solution with reducing agent. If, on the other hand, the hydroxymaltol is predominately in the form wherein the 3-hydroxyl group is substantially completely un-ionized, yields of 30-90 percent of maltol are obtained in one step by reduction.

In aqueous solution, titration data indicate that hydroxymaltol is predominately in the required (I) form within the pH range of up to about 8.8. Therefore, if an aqueous medium is employed, it is required to carry out the process of the present invention within this pH range. If it is desired to carry out the reaction in other appropriate solvents as, for example, alcohols, acids, and the like, it is obvious that consideration must be given to the effect of the acidity of the medium on the tendency of one of the particular forms of hydroxymaltol to predominate. The range of operable acidity in any solvent can be determined readily by commonly employed techniques. One particularly advantageous method is to titrate a solution of hydroxymaltol in the selected solvent medium and from these data to determine the points of dissociation of the respective species.

The nature of the solvent to be employed in the process of this invention is not critical as long as it is inert with respect to the reducing agent employed. Thus it is feasible to employ, for example, water, lower alkanols such as methanol, ethanol, isopropanol, and the like, and acetic acid either singularly or in admixture.

The temperature at which the reduction is carried out is not critical to the process of the present invention. Thus, the one-step reduction can be carried out over a range of from about 5° to about 125° C. Since there is some tendency for undesirable side reactions to occur at the extremes of this range, it is usually preferred to conduct the reaction in a range of from about 25° to about 75° C., and it is especially preferred to maintain the reaction temperature at about 55-60° C. The time required for completion varies with the type of reducing agent employed and also with the temperature of the reaction. It has been found, for example, that if the reduction is carried out with zinc and an acid at a pH of about 1, and at a temperature of 55-60° C. the hydroxymaltol has been substantially completely consumed after about 4 hours.

As has been mentioned hereinbefore, the starting material may be hydroxymaltol isolated from the hydroxymethylation of pyromeconic acid. This may be redissolved in the solvent to be employed in the subject reduction step. An alternative, and preferred embodiment of the process of the present invention, however, is to reduce the hydroxymaltol directly and without prior isolation. As is obvious, this preferred embodiment eliminates a filtration step.

According to the process of this invention, the clear hydroxymaltol solution prepared as described above in the hydroxymethylation of pyromeconic acid or, alternatively, made by adding about one part of hydroxymaltol to about 5 parts of water is treated with enough 50 wt.-percent aqueous acid, for example, sulfuric or hydrochloric, to bring the pH to below about 5. The slurry is then heated to about 50-55° C. and an amount of zinc dust equivalent to the weight of contained hydroxymaltol is added. This is equivalent to about 2 moles of zinc dust per mole of hydroxymaltol, i.e., a 100 percent excess, although with certain grades of zinc dust, less may be required. The reason for the variation in efficiency between certain grades of zinc dust is not clearly understood at the present time although in some cases about 1.3 moles of zinc per mole of hydroxymaltol has been found to be sufficient. The reaction mixture is then stirred vigorously and an aqueous solution of about 10 N hydrochloric acid containing at least a stoichiometric amount of acid based on the hydroxymaltol present is slowly added over a period of about one hour. It is required that the temperature be carefully maintained below about 60° C. otherwise there is a tendency for the reaction mixture to boil uncontrollably. After all of the acid has been added the reaction mixture is maintained at about 55-60° C. for from about 3 to about 5 hours.

The extent of completion of the reaction may be determined by a paper chromatographic assay of the reaction mixture using pure hydroxymaltol as a reference. A suitable developing medium for said assay is comprised of 2 parts of chloroform, 2 parts of 90 percent formic acid and 1 part of dilute ethanol which is prepared by mixing 36 parts of Specially Denatured Alcohol No. 3A with 4 parts of water. The hydroxymaltol spots are viewed with a 254 millimicron lamp and ultraviolet scanner, and then sprayed with a 1 percent ferric chloride solution. When the hydroxymaltol spot from the reaction mixture is weak or has disappeared the reduction is considered complete.

When the assay indicates the reaction to be complete, the maltol can be isolated according to the following procedure: the mixture is heated and then is brought to a pH of about 2 by the addition of a 50 wt.-percent solution of sodium hydroxide. For best filtration results, the temperature should reach about 90-95° C. during this step. Unreacted zinc is removed by passing the reaction mixture through a filter, preferably preheated to minimize plugging and the zinc is washed with an amount of hot water equivalent to about 10 percent of the total reaction mixture. The filtrate is then cooled to about 5–10° C. to precipitate the maltol; it is preferred to cool the filtrate slowly during about 3 to 4 hours as this gives maltol in a more easily filterable form. The crystalline product is removed by filtration and, after washing with an equal amount of cold water, is dried by standard techniques. An especially advantageous method comprises drying the maltol at about 60° C. in a vacuum of about 100–200 mm. Hg until it is substantially free of solvent and then reducing the temperature to about 40° C. to finish the drying process. If the entire drying operation is carried out at 60° C., there is some tendency for the maltol to sublime.

A number of reducing means may be employed in the process of this reaction. For example, in addition to the zinc-hydrochloric acid couple described above there may be used other metal-acid couples, or, alternatively, chemical reducing agents or, hydrogen and a catalyst may be used. It is not feasible to employ strongly basic reagents such as sodium and alcohol to effect the reduction since these are usually only effective in media wherein hydroxymaltol would exist predominately in its anionic species (II).

With respect to the employment of metal-acid couples as the reducing agent it has been found that zinc, iron, aluminum, tin, magnesium, and the like, are effective to displace hydrogen from the acid. It is especially preferred to use zinc since this metal, in addition to its economic advantage, has a tendency to provide maltol of somewhat higher purity and lighter color. Mineral or monocarboxylic saturated open-chain aliphatic acids that have from 1 to 10 carbon atoms and which are soluble in the reaction system can be employed in combination with metals of the aforesaid type. Among the mineral acids which are particularly effective are hydrochloric and sulfuric acid and among the organic acids which are particularly effective are formic and acetic. It is especially preferred to use hydrochloric acid in this reaction since the maltol formed has a tendency to be obtained in higher yield and in higher purity.

Maltol may be obtained by the process of this reaction if a chemical reducing agent such as hydrosulfurous acid, or an alkali or alkaline earth metal salt thereof is employed. For example, there can be used sodium, potassium, lithium, calcium, and magnesium hydrosulfite, and the like. Especially preferred because it is freely available, economical and an especially strong reducing agent is sodium hydrosulfite. The use of this reagent in the one-step reduction of hydroxymaltol to maltol will be exemplified in detail hereinafter.

Another effective reducing means to be employed in the process of this invention is hydrogen. It is necessary to use a noble metal catalyst to effect the reduction with hydrogen and it has been found that the best yields are obtained at a pH range of from about 1 to about 3.

Strong maltol spots by paper chromatographic assay techniques are obtained after reductions of mixtures at pH 1, 2 and 3, respectively, and yields of 30 percent of maltol are obtained after isolation. The type and form of the noble metal catalysts employed have not been found to be critical to the invention. Thus, platinum and palladium either in the form of the finely divided metals or supported on carbon or charcoal may be used. It is especially preferred to use palladium on carbon catalyst because of its high activity. The use of hydrogen and a catalyst as a reducing means for the direct conversion of hydroxymaltol to maltol is exemplified in detail hereinafter.

Of course, as is obvious, as one embodiment of this invention maltol may be obtained starting with meconic acid instead of kojic acid. As is exemplified hereinafter, meconic acid, which is 2,6-dicarboxy-3-hydroxy-gamma-pyrone and is obtained as an opium derivative, may be decarboxylated by the process sequence represented by steps (2a) and (2) of the instant invention to form pyromeconic acid, the pyromeconic acid may be converted to hydroxymaltol by step (3) of the instant invention and the hydroxymaltol may be converted to maltol by step (4) of the instant invention. These and the above steps are illustrated in the attached drawing.

This application is a continuation-in-part of the application of Robert L. Miller, Serial No. 154,036, filed November 21, 1961, and now abandoned, and assigned to the assignee of the present application.

The procedures referred to above are illustrated in the flow diagram.

The following examples are illustrative of the process of this invention.

*Example I*

In an 8-liter stainless steel vessel fitted with a stirrer and an air sparger is placed a suspension of 350 grams of kojic acid in 3500 ml. of water. The pH is adjusted to 11.1 by addition of 256 ml. of 50 percent aqueous sodium hydroxide and then 142 g. (7.1 g. as metal) of a 5 percent palladium on charcoal catalyst is added. Air is passed into the suspension at a rate of about 2100 ml. per minute. The reaction, which is slightly exothermic, is maintained at a temperature of about 20–22 degrees C. by occasional application of external cooling. After 11 hours the reaction mixture is filtered to remove the catalyst and is treated with 600 ml. of concentrated hydrochloric acid. The crystals of comenic acid which precipitate from the pH 0.5 mixture are removed by filtration, washed with a small amount of cold water and are air-dried. There is obtained 328 g. of product. This is 85.3 percent of the theoretical yield. Titration data indicate the product to be 99.2 percent pure; therefore, there is obtained an 84.6 percent yield of comenic acid as corrected for purity.

*Example II*

The procedure of Example I is repeated at 10 degrees, 30 degrees, 40 degrees, and 55 degrees centigrade with substantially the same yield (70–85 percent) of comenic acid being obtained at 10 degrees, 30 degrees and 40 degrees. At 55 degrees centigrade there is obtained a lower yield of a darker brown-colored product.

*Example III*

The procedure of Example I is repeated substituting the following catalysts for palladium on charcoal; platinum black, palladium black, platinic oxide and platinum on charcoal. In all cases, 7.1 g. of catalyst calculated as metal was used. Substantially the same results are obtained.

*Example IV*

The procedure of Example I is repeated substituting oxygen for air and decreasing the flow rate to about one-fourth. Substantially the same results are obtained.

*Example V*

A filtered-reaction mixture prepared as in Example I is adjusted to a pH of below 1 by addition thereto of sulfuric acid and a high yield of high purity comenic acid is obtained. The procedure is repeated substituting nitric acid for hydrochloric acid and substantially the same result is obtained.

*Example VI*

The procedure of Example I is repeated substituting 250 g. of potassium hydroxide (added as a 50 percent aqueous solution) for the corresponding sodium hydroxide solution. Substantially the same results are obtained.

The procedure of Example I is repeated substituting 110 g. of lithium hydroxide (added as a 10 percent aqueous solution) for the corresponding sodium hydroxide solution. Substantially the same results are obtained.

Example VII

In a 150-ml. Pyrex flask fitted with a mechanical stirrer and a thermometer and connected through a distillation head to a receiver are placed 10.0 g. of comenic acid prepared as described in Example I and 30 ml. of diphenyl ether. The reaction mixture is stirred and heated by application of a heating mantle. After about 20 minutes, the temperature reaches 225° C. and gas is observed to pass into the receiver. When the temperature reaches 245–250° C., a vigorous evolution of carbon dioxide is observed. After an additional 40 minutes at 245–250° C., the pyromeconic acid is distilled therefrom until no more passes over at an internal temperature of 255° C. and a vapor temperature of 230° C. Thirty ml. of additional diphenyl ether is added to the reaction flask and a second fraction is obtained after distillation at 255° C. internal temperature for an additional 1 hour and 10 min. The product is suspended in about 5 volumes of hexane, then is removed by filtration, and is recrystallized in 4 volumes of toluene. There is obtained 5.71 g. of pyromeconic acid, M.P. 113–115.5. Concentration of the toluene mother-liquors to about ½₀ volume affords an additional 0.7 g. of somewhat less pure pyromeconic acid. The combined weight of pyromeconic acid obtained represents an 80% conversion.

The procedure is repeated substituting tricresyl phosphate for the diphenyl ether; an 80% yield of pyromeconic acid is obtained. The procedure is repeated substituting dimethyl phthalate for diphenyl ether; substantially the same results are obtained.

Example VIII

The procedure of Example VII is repeated substituting the following solvents for diphenyl ether:

Naphthalene
1-methylnaphthalene
2-ethylnaphthalene
3-methylnaphthalene
3-t-butylnaphthalene
1,2-dimethylnaphthalene
1,4-dimethylnaphthalene
1,8-methylpropylnaphthalene
Tetrahydronaphthalene
1-methyltetrahydronaphthalene
8-methyltetrahydronaphthalene
1,4-dimethyltetrahydronaphthalene
6-ethyltetrahydronaphthalene
1,8-methylpropyltetrahydronaphthalene
2-methyl diphenyl ether
3-methyl diphenyl ether
4-ethyl diphenyl ether
4-methyl diphenyl ether
4,4'-dimethyl diphenyl ether
2,2'-dimethyl diphenyl ether
2,4-dimethyl diphenyl ether
Triethylene glycol dibutyl ether
Triethylene glycol diphenyl ether
Tetraethylene glycol dimethyl ether
Hexaethylene glycol dimethyl ether
Triphenyl phosphite
4,4',4''-trimethyltriphenyl phosphite
2,2',2''-trimethyltriphenyl phosphite
3-t-butylphenyl diphenyl phosphite
2,2',2''-trimethyltriphenyl phosphate
4,4',4''-trimethyltriphenyl phosphate
3-t-butylphenyl diphenyl phosphate
N-butyl pyrrolidone
N-cyclohexyl pyrrolidone
N-2-ethylhexyl pyrrolidone
Caprilic acid
Lauric acid
Palmitic acid
Isodecanoic acid
Diethylene glycol monobutyl ether monobutyrate
Triethylene glycol monomethyl ether monoacetate
Hexaethylene glycol monomethyl ether monoacetate
Diethylene glycol monobutyl ether acetate
Triethylene glycol monophenyl ether monoacetate
Diethylene glycol monomethyl ether monobenzoate
Diethyl phthalate
Dibutyl phthalate
Dimethyl terephthalate
Dimethyl isophthalate
Dimethyl 3-i-propylphthalate
Dimethyl 2,3-dimethylphthalate Substantially the same results are obtained.

Example IX

In a 5-gallon stainless steel reaction vessel fitted with a mechanical stirrer, thermometer and distillation receiver are placed 1750 g. of comenic acid prepared as described in Example I and 2675 ml. of dimethyltetraethylene glycol (Ansul Ether E–181). A vacuum of 130–160 mm. of Hg is applied to the system and the reaction mixture is heated to 210–215° during about 1 hour and heating is continued for an additional 8 hours. When the reaction temperature reaches 210°, the vigorous evolution of carbon dioxide is observed and pyromeconic acid begins to distill from the vessel. At the end of the reaction, pyromeconic acid has ceased to distill. During the reaction the solvent which codistills with the product is returned periodically to the vessel. The pyromeconic acid is collected and is suspended in about 5 volumes of hexane and the product is recovered from the suspension by filtration. After drying there is obtained pyromeconic acid in an amount representing a 76 percent yield.

The procedure is repeated reducing the amount of solvent to 2175 ml. and adding the comenic acid semicontinuously to the hot mixture during 2.7 hours. No vacuum is applied to the system. A yield of pyromeconic acid corresponding to 80 percent of theory is obtained.

Example X

In a 2-l. Pyrex flask are placed 1000 ml. of absolute methanol and 100 g., 0.89 mol of pyromeconic acid prepared as in Example IX. To this solution is added slowly 90 g. of a 50 wt.-percent aqueous solution of sodium hydroxide; the pH of the resulting solution is about 10. The reaction mixture which has spontaneously reached a temperature of about 35° C. during said addition is treated with 154 ml. of a 37% aqueous solution of formaldehyde. The reaction mixture is stirred for about 16 hours, during which time the solid phase changes in appearance, then is treated with a solution of 35 ml. of concentrated sulfuric acid in 65 ml. of water. The reaction mixture is then evaporated to near dryness at a temperature of about 50° C. and a pressure of about 15 mm. and the solids are extracted with 2–750 ml. portions of isopropanol heated to about 90° C. Concentration of the combined isopropanol extracts to about 1000 ml. causes a first crop of hydroxymaltol to precipitate and this is removed by filtration. Further concentration of the isopropanol filtrate to about 500 ml. causes a second crop of hydroxymaltol to precipitate. A third crop is obtained by concentration of the hydroxymaltol to about 250 ml. The combined weight of hydroxymaltol obtained is 107.4 g.; this corresponds to an 84.6 percent yield.

The procedure is repeated substituting isopropanol for the methanol reaction solvent. Substantially the same results are obtained.

The procedure is repeated substituting for the sodium hydroxide stoichiometrically equivalent amounts of the following bases: lithium hydroxide, potassium hydroxide and calcium hydroxide. Substantially the same results are obtained.

Example XI

Pyromeconic acid, 1000 g., 8.92 moles, prepared as described in Example IX is dissolved in 4.9 liters of water in a stainless steel vessel. The pH is adjusted to 10.0 with 447 ml. (8.47 moles) of 18.9 N sodium hydroxide solution. Then 669 ml., 8.92 moles, of 37% by weight aqueous formaldehyde is added. The temperature spontaneously rises to 45° C. then gradually decreases to 29° C. during a 2 hour stirring period. The hydroxymaltol is precipitated from the clear solution by adjusting the pH to 5 with 705 ml. of 12 N hydrochloric acid. The slurry is cooled to 5° C., stirred for 30 minutes and is filtered. The hydroxymaltol is washed with 3 liters of ice water and is vacuum dried. The first crop of hydroxymaltol, M.P. 154–5° C., weighs 949 g. and represents 75% of the theoretical yield. Concentration of the 9.5 liters of mother liquor to about 2 liters in a vacuum of about 20 mm. Hg yields a second crop of 152 g. The total yield of hydroxymaltol, therefore, is 87 percent of the theoretical.

The procedure is repeated substituting appropriate amounts of 18.9 N aqueous sodium hydroxide solution for the 447 ml. used hereinbefore and adjusting to the respective pH's tabulated hereinafter. It is found that as the pH is increased over the range of from 6 to 13 the reaction rate increases as measured by yield as a function of time. The results are given in terms of yield at the optimum reaction times.

| pH | Optimum Time, hrs. | Percent Yield of Hydroxymaltol | |
|---|---|---|---|
| | | Total | M.P. >130° C., Percent |
| 6 | 24 | 53 | 0 |
| 7 | 24 | 67 | 66 |
| 8 | 10 | 77 | 70 |
| 9 | 3 | 86 | 78 |
| 10 | 1.5 | 85 | 82 |
| 13 | 1.5 | 73 | 68 |

The percent of the product melting above 130° C. is a measure of its purity. Thus it is observed that at pH's of above about 8 there is a significant increase in both the yield and purity of the hydroxymaltol and a decrease in the optimum reaction time. It is also observed that at pH 13 there tends to be a decrease in yield and purity although the optimum reaction time remains unchanged. At a pH of 5, a somewhat lower than 50% yield of hydroxymaltol is obtained.

*Example XII*

In a 300-ml. Pyrex flask fitted with a magnetic stirrer, condenser and addition funnel is placed 10.0 (0.07 mole) of hydroxy maltol prepared as in Example XI, 10.6 g. (0.16 g.-atom) of zinc dust, 60 ml. of water and 50 drops of a 1% aqueous solution of cupric sulfate. The reaction mixture is stirred and heated to reflux and 34 ml. of concentrated hydrochloric acid is added dropwise during about ½ hour. After 2 hours of refluxing, the reaction is filtered hot to remove unreacted zinc and the pH of the filtrate is adjusted to pH 10 by the addition of a 20% aqueous sodium hydroxide solution. The precipitated zinc hydroxide is removed by filtration and is washed with 30 ml. of water at 60° C. The combined filtrates are adjusted to pH 4 with 20% aqueous hydrochloric acid and, after cooling to about 10° C., the crop of crystals of maltol are collected by filtration. There is obtained 3.97 g. of maltol, M.P. 156–158° C. Extraction of the filtrate with 5–50 ml. portions of chloroform and evaporation of the chloroform yields an additional 2.12 g. of maltol. The combined weight of product is 6.09 g.; this represents a 69 percent yield.

The procedure is repeated this time without using the copper sulfate solution. Substantially the same results are obtained.

The procedure is repeated substituting for the zinc dust, stoichiometrically equivalent amounts of the following metals: iron, aluminum, tin and magnesium. Substantially the same results are obtained.

The procedure is repeated substituting for the hydrochloric acid stoichiometrically equivalent amounts of the following organic acids: formic, acetic and isodecanoic. With the C–10 acid, it is desirable to add an appropriate quantity of a co-solvent to the predominately aqueous system to promote solubility.

Substantially the same results are obtained.

*Example XIII*

Hydroxymaltol, 10 g., is dissolved in 100 ml. of water and the pH of the solution is adjusted to 1 by the addition of 10% hydrochloric acid solution. To the reaction mixture is added 1.0 g. of a commercial 10% palladium on charcoal catalyst and the suspension is shaken in a hydrogenation apparatus at 25° C. under an initial hydrogen pressure of 50 pounds per square inch gauge. When an amount of hydrogen equivalent to 1 mole per mole of hydroxymaltol has been taken up, the reaction is stopped, the reaction mixture is filtered, and the solvent is evaporated from the reaction mixture. The residue is recrystallized by dissolving it in 100 ml. of water at 95° C. then cooling the solution to 1° C.; there is obtained 2.1 g. of maltol of high purity. This corresponds to a yield of 30 percent of the theoretical.

The procedure is repeated substituting the following catalysts for palladium on charcoal on an equal weight based on the metal basis: platinum black, palladium black, platinic oxide and platinum on charcoal. Substantially the same results are obtained.

*Example XIV*

Sodium hydrosulfite, 1180 g., is dissolved in 11.4 liters of water in a 22-liter Pyrex glass flask. The pH of the solution is 5.8. To this solution at 25° C. is added 575 g. of hydroxymaltol during a 20 minute period together with portions of a 10 N aqueous sodium hydroxide solution as required to maintain the pH at 5.0–5.5. The reaction mixture is stirred for 30 minutes, then is heated to 90° C. during an additional 30 minutes. A small amount of a solid impurity is removed by filtration of the hot solution, then the filtrate is cooled to 15° C. After stirring for an additional 30 minutes at 15° C., the maltol is removed by filtration and is washed with 1.4 liters of ice-water. Extraction of the filtrate with four 6 liter portions of chloroform and evaporation of the chloroform yields are second crop of maltol. There is obtained 173 g. of maltol; this represents a 30% yield of theoretical.

The procedure is repeated substituting for the sodium hydrosulfite the following salts: lithium hydrosulfite, potassium hydrosulfite, calcium hydrosulfite and magnesium hydrosulfite. Substantially the same results are obtained.

*Example XV*

Kojic acid is converted to comenic acid in 85% yield by the procedure described in Example I. Comenic acid is decarboxylated to pyromeconic acid in 76% yield by the procedure described in Example IX. To a 100 gallon glass lined vessel is added 44.5 gallons of water and 75 lbs. (0.67 lb. mole) of pyromeconic acid. The mixture is stirred and 4 gallons of 50% aqueous sodium hydroxide solution is added and the final pH is 10. During the addition of sodium hydroxide the temperature rises and cooling water is used to prevent the temperature from exceeding 40° C. Six gallons of a 37% aqueous solution of formaldehyde is added and within several minutes, the temperature shows a tendency to increase. It is held in the range of 35–40° C. by application of cooling water for approximately 3 hours. To the clear reaction mixture is added 5.8 gallons of 50% sulfuric acid solution, the resulting mixture is heated to 50–55° C. and 87.5 lbs. of zinc dust is added. The suspension is strongly agitated and 32.3 gallons of 10 N hydrochloric acid solution is slowly added during 45 minutes and the temperature is maintained at 55–60° by means of cooling water. After an additional 4 hours at 55–60° C., paper chromatographic assay shows the hydroxymaltol to have been completely reacted. The mixture is heated and simultaneously neutralized to pH 2 with 50 percent sodium hydroxide solution (6 gallons) and the final temperature is 90–95° C. The zinc is filtered on a 24-inch preheated porcelain filter and is washed with 3 gallons of water at 80–90° C. The combined filtrates are cooled slowly over a period of 3 to 4 hours to 5–10° C. and the crystalline maltol which precipitates is collected on a 24-inch porcelain filter. The filter cake is washed with 10 gallons of cold water and is dried in a vacuum of 100 mm. of Hg first at 60° C. until nearly free of water, then at 40° C. until completely dry. There is obtained 60 lbs. of maltol, M.P. 159–160° C., with a sulfate ash content of less than 0.5%, and indicated to be of 98–100% purity by assay. Extraction of the filtrate with 5½₂ volumes of chloroform and evaporation of the chloroform extracts yields an additional 20% yield of somewhat less pure maltol. The combined yield of maltol based on pyromeconic acid is 91% of the theoretical. The yield of maltol based on kojic acid therefore is 59 percent.

*Example XVI*

The procedure of Example IX is repeated substituting 10 g. of meconic acid, obtained by extraction from opium, for the corresponding comenic acid. This material is decarboxylated under the same conditions by this procedure to yield pyromeconic acid. The pyromeconic acid is converted to hydroxymaltol by following the procedure of Example XI to the point immediately prior to precipitation with 12 N hydrochloric acid. The hydroxymaltol in the clear solution is treated with 2 gram-atomic equivalents of zinc dust and 2 moles of hydrochloric acid per gram atomic weight of zinc as described in Example XII and the maltol formed in situ thereby is recovered as described therein. Maltol of very high quality is obtained.

What is claimed is:

1. The process which comprises treating kojic acid with oxygen in the presence of a noble metal catalyst at a pH of at least about 10 to form comenic acid, decarboxylating said comenic acid to form pyromeconic acid, treating the pyromeconic acid with formaldehyde at a pH of at least about 5 to form hydroxymaltol and reducing the hydroxymaltol under acidic to substantially neutral conditions to form maltol.

2. The process which comprises treating kojic acid with oxygen in the presence of a noble metal catalyst at a pH of at least about 10 to form comenic acid, decarboxylating said comenic acid to form pyromeconic acid and treating the pyromeconic acid with formaldehyde at a pH of at least about 5 to form hydroxymaltol.

3. The process which comprises decarboxylating a compound selected from the group consisting of comenic acid and meconic acid to form pyromeconic acid, treating the pyromeconic acid with formaldehyde at a pH of at least about 5 to form hydroxymaltol and reducing the hydroxymaltol under acidic to substantially neutral conditions to form maltol.

4. In a process for direct oxidation of kojic acid to the corresponding 2-carboxylate by treatment of an aqueous solution of kojic acid with oxygen in the presence of a noble metal catalyst, the improvement which comprises maintaining the pH of the said solution at a value of at least 10 during treatment with oxygen.

5. An improved process for the direct oxidation of kojic acid to comenic acid which comprises adjusting an aqueous kojic acid solution to a pH of at least 10 with an alkali metal hydroxide, introducing oxygen into said solution in the presence of a noble metal catalyst selected from the group consisting of finely-divided platinum, finely-divided palladium, platinum oxide, platinum on charcoal and palladium on charcoal, maintaining said minimum pH during oxygenation, continuing the oxygenation until the kojic acid alkali metal salt is substantially completely consumed, subsequently adjusting the pH to a value below about 2.5 with mineral acid and recovering the comenic acid thereby produced.

6. The process which comprises treating pyromeconic acid with formaldehyde at a pH of at least about 5 to form hydroxymaltol and reducing the hydroxymaltol in situ to form maltol.

7. An improved process for the preparation of pyromeconic acid from comenic acid which comprises heating comenic acid in a solvent selected from the group consisting of naphthalene and mono- and di-lower alkylnaphthalenes; tetrahydronaphthalene and mono- and di-lower alkyl tetra-hydronaphthalenes; diphenyl ether and mono- and di-lower alkyl and mono- and di-lower alkoxy-substituted diphenyl ethers; polyglycol diethers and monoether monoesters of the formula $RO(CH_2CH_2O)_nR'$ wherein $n$ is an integer of from 2 to 6, R is selected from the group consisting of lower alkyl and phenyl and R' is selected from the group consisting of lower alkyl, lower acyl and phenyl; triphenyl phosphite and phosphate and their mononuclear lower alkylated derivatives; aliphatic cyclic amides of the formula

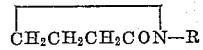

wherein R is alkyl containing from 4 to 8 carbon atoms; monocarboxylic saturated aliphatic open-chain acids containing from 8 to 16 carbon atoms; and di-lower alkyl esters of phthalic acid and its mononuclear lower alkyl substituted derivatives to a temperature of at least that at which carbon dioxide substantially is evolved, maintaining said temperature until evolution of carbon dioxide substantially ceases and recovering the pyromeconic acid which forms.

8. An improved process for the preparation of hydroxymaltol which comprises adding an approximately molecular equivalent of formaldehyde to an aqueous solution of pyromeconic acid adjusted to a pH of at least about 8.

9. An improved process for the preparation of hydroxymaltol which comprises reacting formaldehyde with pyromeconic acid in solution in an alcohol having from 1 to 3 carbon atoms and containing a substantially stoichiometric proportion, based on the pyromeconic acid, of a base selected from the group consisting of alkali metal hydroxides and alkaline earth hydroxides.

10. A one-step process for the preparation of maltol which comprises treating with a reducing agent a solution of hydroxymaltol wherein the 3-hydroxyl group of said hydroxymaltol is predominantly in the un-ionized form.

11. A process as in claim 10 wherein said reducing agent is a metal-acid couple, said metal being selected from the group consisting of zinc, iron, aluminum, tin and magnesium and said acid being selected from the group consisting of mineral acids and those monocarboxylic saturated open-chain aliphatic acids that have from 1 to 10 carbon atoms and are soluble in the reaction system.

12. A process as in claim 10 wherein said reducing agent is selected from the group consisting of hydrosulfurous acid and its alkali metal and alkaline earth metal salts.

13. A process as in claim 10 wherein said reducing agent is hydrogen activated by a noble metal catalyst.

14. A process for the preparation of maltol from kojic acid which comprises adjusting an aqueous kojic acid solution to a pH of at least 10 with sodium hydroxide, introducing oxygen into said solution in the presence of a palladium catalyst, maintaining said minimum pH during oxygenation, continuing the oxygenation until the kojic acid sodium salt is substantially completely consumed, subsequently adjusting the pH to a value below about 2.5 with mineral acid, recovering the comenic acid formed thereby, decarboxylating said comenic acid to pyromeconic acid, recovering said pyromeconic acid, adding an approximately molecular equivalent of formaldehyde to an aqueous solution of said pyromeconic acid adjusted to a pH of at least about 8, recovering the hydroxymaltol formed thereby; treating with a zinc and hydrochloric acid reducing agent a solution of said hydroxymaltol wherein the 3-hydroxyl group of said hydroxymaltol is predominantly in the un-ionized form and recovering the maltol.

15. A process for the preparation of maltol from kojic acid which comprises adjusting an aqueous kojic acid solution to a pH of at least 10 with sodium hydroxide, introducing oxygen into said solution in the presence of a palladium catalyst, maintaining said minimum pH during oxygenation, continuing the oxygenation until the kojic acid sodium salt is substantially completely consumed, subsequently adjusting the pH to a value below about 2.5 with mineral acid, recovering the comenic acid formed thereby, heating said comenic acid in diphenyl ether to a temperature of at least about 230° C., maintaining said temperature until evolution of carbon dioxide substantially ceases, recovering the pyromeconic acid formed thereby, adding an approximately molecular equivalent of formaldehyde to an aqueous solution of said pyromeconic acid adjusted to a pH of at least about 8, treating the solution of hydroxymaltol formed thereby wherein the 3-hydroxyl group of said hydroxy-maltol is predominantly in the un-ionized form with a zinc and hydrochloric acid reducing agent, and recovering the maltol which is formed.

References Cited in the file of this patent

Fieser et al.: Organic Chemistry, Third Edition, page 837, Reinhold Publishing Corp., New York (1956).